2 Sheets—Sheet 1.
D. T. PERKINS.
Fire Extinguisher.
No. 231,190.  Patented Aug. 17, 1880.
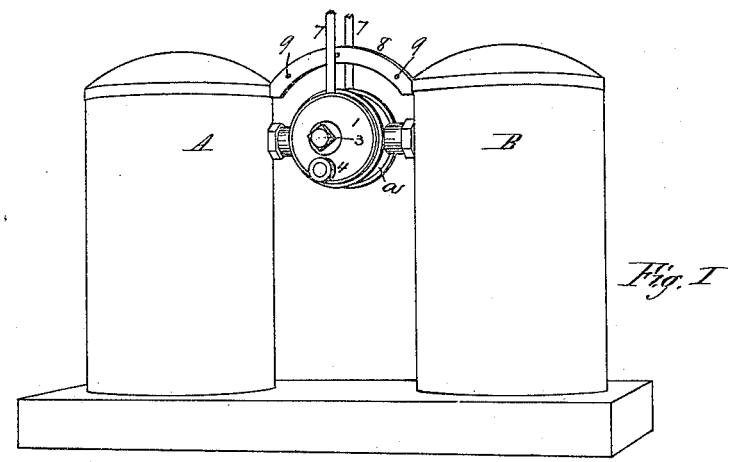
Fig. I.
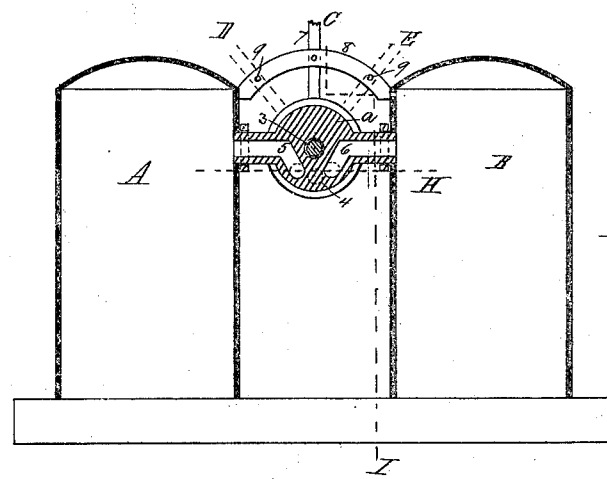
Fig. II.
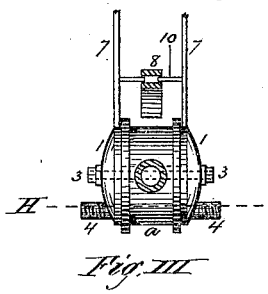
Fig. III.
Witnesses.
J. E. Hall.
J. E. Curtis.
Inventor,
Duane T. Perkins
By T. A. Curtis
his atty.
N. PETERS, PHOTO-LITHOGRAPHER, WASHINGTON, D. C.

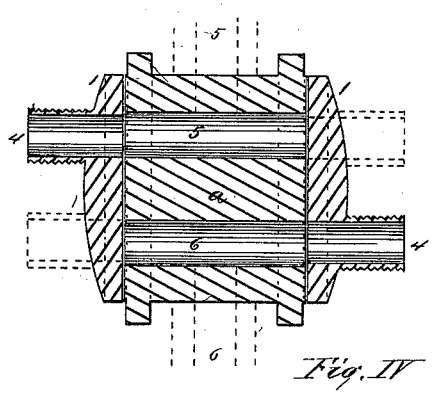

UNITED STATES PATENT OFFICE.

DUANE T. PERKINS, OF SPRINGFIELD, MASSACHUSETTS.

FIRE-EXTINGUISHER.

SPECIFICATION forming part of Letters Patent No. 231,190, dated August 17, 1880.

Application filed January 28, 1880.

*To all whom it may concern:*

Be it known that I, DUANE T. PERKINS, of Springfield, in the State of Massachusetts, have invented a new and useful Improvement in Fire-Extinguishers; and I do hereby declare that the following is a full, clear, and exact description thereof, reference being had to the accompanying drawings, making a part of this specification, and to the letters of reference marked thereon.

My invention relates to that class of fire-extinguishers which are provided with tanks, in which chemicals are used to liberate carbonic-acid gas, with which the liquid contained in the tanks is more or less charged.

The object of my invention is to take a stream of water from either tank, and to change the outlet-orifice, to which the hose is attached, from one tank to the other as quickly as possible, and with little or no check to the stream during the time such change is made, and yet avoid the ordinary manipulation of screw-valves.

To this end my invention consists of a plug provided with two or more ports, each communicating with the interior of a tank arranged to contain the liquid and chemicals, and provided with a disk or cap pivoted so as to oscillate thereon, said disk having an outlet-orifice to which to secure the hose, and which may be moved into communication with either port in the plug, as will be more fully hereinafter set forth.

Figure I is a perspective view, showing my invention applied to an extinguisher having two tanks. Fig. II is a vertical section at a plane through the ports leading from each tank into the plug. Fig. III is a vertical section at line I, showing a rear view of the plug, with a disk or cap arranged to oscillate on each end. Fig. IV is a horizontal section of the plug and its disks at line H of Figs. II and III, showing a portion of the port which communicates with each tank, and showing the positions into which each disk may be oscillated to bring its outlet-orifice into communication with either port.

In the drawings, A and B represent the two tanks of a fire-extinguisher, between which is placed a plug, *a*, cylindrical in form, to one or both ends of which is fitted a disk or cap, 1, which is pivoted to the plug by a bolt, 3. This plug is provided with two ports, 5 and 6, one of which, 5, communicates with the interior of the tank A, and the other, 6, with the interior of the tank B. The disk or cap 1 is provided with a single orifice, 4, with a suitable arrangement to connect the hose thereto, and the disk is fitted to the plug sufficiently snug and tight, so that when the orifice 4 is in a position between the ports 5 and 6, as shown in Fig. II, no water can flow from either tank through the orifice into and through the hose.

For convenience of securing the disk in any desired position, a handle, 7, may be secured to the upper side of the disk, which handle may be somewhat elastic, and provided with a projection or pin, 10, which, when the handle is in the desired position, may enter a hole in a bar, 8, extending along above the disk or cap, the elastic handle thus serving as a spring-detent in retaining the disk in the desired position.

When the disks 1 are duplicated—that is, when there is one on each end of the plug—they may both be secured by the same pivot or bolt 3 with a nut on each end, and in this case the ports 5 and 6 may extend through the plug from end to end. One disk may then be used for filling one tank while the opposite disk is being used to discharge the other tank, and either disk may be used for either purpose.

The operation of my invention is as follows: Suppose the outlet-hose to be connected to the orifice 4 on one of the disks and the tank A to be filled with water and charged with chemicals. If the detent-handle 7 is set in a vertical direction, with its pin 10 in the hole above, the outlet 4, with the hose attached, will stand just between the ports 5 and 6, as shown in Fig. II, and no water can be forced out; but if the detent-handle 7 be moved into the position E, the outlet 4 will be brought in front of the port 5 and the water in the tank A will be forced out through the hose by the pressure of gas in the tank. While this is being done a supply-hose may be attached to the orifice 4 in the opposite disk, 1, whose detent-handle being thrown into the position D, the orifice 4 of that disk is in front of the port 6, and water may then pass into and fill the tank B. This being done, that detent-handle may then be moved into a vertical position, the chemicals introduced in any convenient manner, and the tank B is then charged and ready for operation.

When the tank A is emptied, or nearly so, the detent-handle of the first disk is changed quickly into the position D, bringing the orifice 4 in front of the port 6, and the tank B is emptied, while the tank A is refilled by the movement of the opposite disk, and so on, each tank being refilled while the other one is emptied.

It is immaterial as to which disk is used to discharge and which to fill the tanks, as both operate precisely alike, and either may be used for either purpose, and the tanks may be refilled or may be discharged from either side.

When the disk is changed to switch or move the orifice 4 from the port 5 to the port 6, the flow of water from the tank A is suddenly stopped, and the flow from the tank B as suddenly commences through the orifice and hose, and vice versa, so that there is very little, if any, check to the flow of the stream, so suddenly and quickly are the hose and stream transferred from one tank to the other.

By thus refilling one tank while the other is being discharged an almost uninterrupted stream may be kept up from the hose, first from one tank and then the other, by the simple movement of the disks upon the pivot, and without the ordinary turning of screw-valves.

This keeping up of a constant stream from two tanks, I am aware, has heretofore been accomplished by pipes connecting and communicating with both tanks, and the flow from either one controlled by turning in one screw-valve and turning out another; but this method is objectionable, as it sometimes happens that the operator, after one tank was discharged, neglected to close that valve and opened the other, and the filled tank discharged a portion of its volume into the tank last emptied until the pressures were equal. This not being noticed immediately, some time is lost in rearrangement or readjustment of parts. With my device this could not possibly happen, as the tanks do not in any manner communicate with each other by a water-way. The water-ways from both tanks are entirely separate and distinct, and cannot by any possibility be made to connect with each other, and the hose, when connected with the outlet 4, is switched or moved from the water-way from one tank to that from the other when the stream is changed from one tank to the other, both stream and hose being bodily changed or transferred from one location to another.

Three tanks, or even more, might be used with this device by having the requisite number of ports 5 and 6 in the plug $a$; but I consider two quite sufficient, as one can so readily be refilled while the other is being emptied, so that a constant stream may be kept up as long as the water and chemicals are supplied.

Having thus described my invention, what I claim as new is—

In a fire-extinguishing apparatus, the combination of a plug provided with two or more ports, 5 and 6, each port communicating with the interior of a tank, and a disk or cap having an outlet-orifice, 4, which may be moved into communication with either of said ports, substantially as and for the purpose described.

DUANE T. PERKINS.

Witnesses:
  T. A. CURTIS,
  F. E. HALL.